Figure 1:
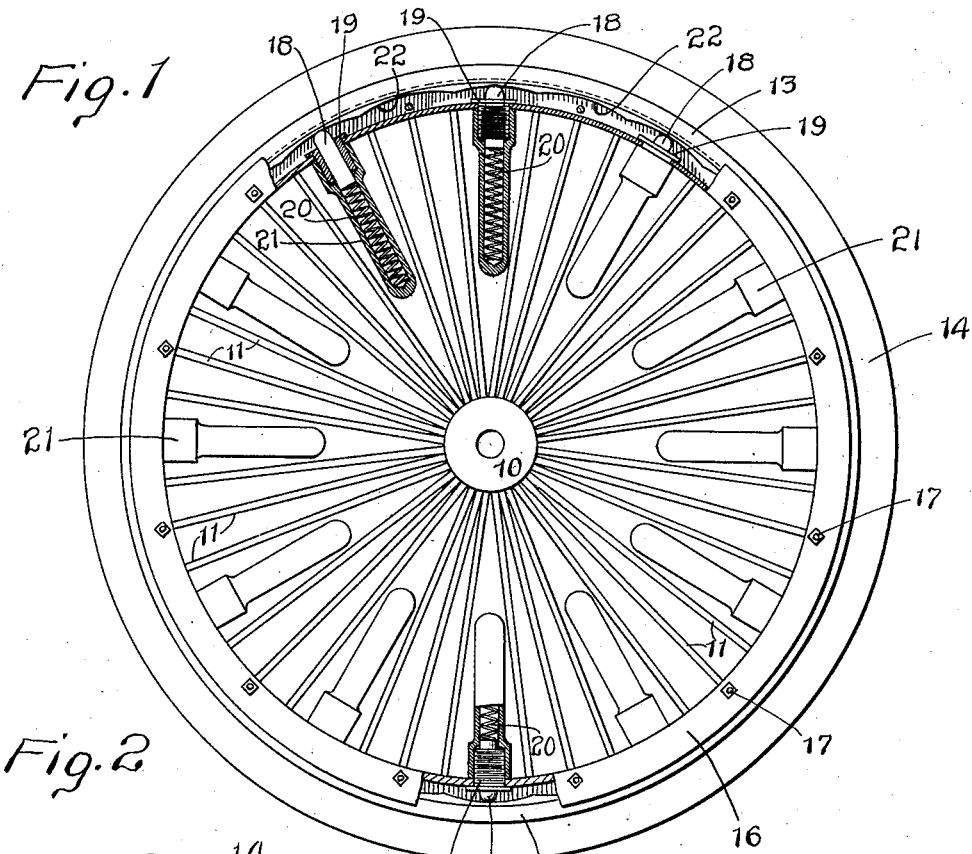

H. KIRKBY.
RESILIENT WHEEL.
APPLICATION FILED APR. 15, 1913.

1,078,149.

Patented Nov. 11, 1913.

WITNESSES:
H. W. Meade
S. W. Atherton

INVENTOR
Harold Kirkby
BY
A. M. Booster
ATTORNEY

UNITED STATES PATENT OFFICE.

HAROLD KIRKBY, OF MIDDLETOWN, CONNECTICUT.

RESILIENT WHEEL.

1,078,149. Specification of Letters Patent. Patented Nov. 11, 1913.

Application filed April 15, 1913. Serial No. 761,222.

*To all whom it may concern:*

Be it known that I, HAROLD KIRKBY, a citizen of the United States, residing at Middletown, county of Middlesex, State of Connecticut, have invented an Improvement in Resilient Wheels, of which the following is a specification.

This invention has for its object to produce a resilient wheel adapted for use upon bicycles, road wagons and the various types of motor vehicles as runabouts, touring cars and trucks, which shall avoid the use of pneumatic tires and shall provide the required amount of resilience by means of springs so disposed as to act upon a floating rim and be unaffected by the intense heat of the tire developed by the friction of use.

With this end in view I have devised the novel resilient wheel which I will now describe, referring to the accompanying drawing forming a part of this specification and using reference characters to indicate the several parts.

Figure 2:
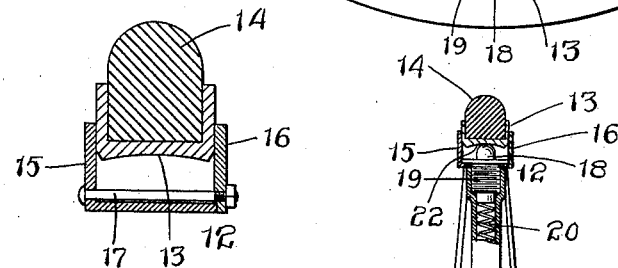
Figure 3:
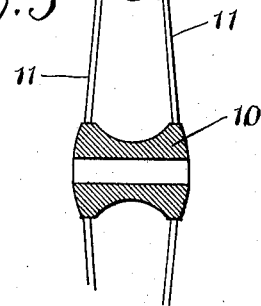

Figure 1 represents an elevation of my novel wheel partly in section to show the mode of construction; Fig. 2 an enlarged sectional view of the felly, rim and tire; and Fig. 3 is a partial transverse section of the wheel.

10 denotes the hub, 11 spokes, 12 the felly as a whole, 13 the rim and 14 the tire. I preferably use an ordinary cushion tire formed of rubber which is carried by a floating rim suitably constructed to receive it. In Fig. 2, I have shown a trough-shaped felly consisting of an L-shaped angle piece, indicated by 15, and a side plate 16 secured thereto by bolts 17. This construction permits the rim and tire to be mounted and demounted with the least possible inconvenience and loss of time. The rim is supported in the felly by a plurality of radially disposed plungers 18 adapted to slide in flanged externally threaded bushings 19 which lie in holes in the inner wall of the felly, the flanges lying in the channel of the felly and preventing rotation of the bushing.

20 denotes coil springs upon which the plungers rest and which are contained in tubular holders 21 which have threaded engagement with the bushings as clearly shown. These springs are made heavy enough to carry the weight of the vehicle and a normal load without appreciable compression at the bottom of the wheel. It will thus be seen that the entire weight carried is supported by the springs through the tire, rim and plungers, the tire and rim having free movement in the felly as indicated in Fig. 2. In use, the blows of stones and the irregularities of the road are taken up by the springs to which the blows are transmitted through the tire, rim and plungers.

In order to leave to the rim free movement in the felly and at the same time prevent creeping of the rim in traveling or when brakes are applied, I provide the inner face of the rim with depressions 22 which receive the rounded outer ends of the plungers and permit slight sliding or creeping movement of the rim; that is, the plungers will ride slightly up the inclines at the ends of the depressions but will slide back as soon as the strain is removed. These depressions may be formed by corrugating the bottom of the rim or may be formed in a separate piece and applied to the inner face of the rim.

Having thus described my invention I claim:

1. A resilient wheel comprising a trough-shaped felly, a trough-shaped floating rim having free movement therein, a plurality of externally flanged and externally threaded bushings extending inwardly through apertures in the bottom of the felly, a holder of the same internal diameter as the bushings having an enlarged internally screw threaded end engaging the inner end of each bushing securing the same firmly to the felly, plungers carried in the holders and bushings engaging the floating rim and springs between the bottom of the plungers and bottom of the holders.

2. A resilient wheel comprising a trough-shaped felly, a trough-shaped floating rim having free movement therein provided with a plurality of transverse depressions upon the under side thereof, a plurality of externally flanged and externally threaded bushings extending inwardly through apertures in the bottom of the felly, a holder of the same internal diameter as the bushings having an enlarged internally screw threaded end engaging the inner end of each bushing securing the same firmly to the felly, and spring pressed plungers carried in the holders and bushings engaging the floating rim, and springs between the bottom of the plungers and bottom of the holders, said plungers having rounded ends and normally arranged with each plunger in engagement
5 with the lowest point of each depression to prevent creeping of the rim in traveling or when brakes are applied.

In testimony whereof I affix my signature in presence of two witnesses.

HAROLD KIRKBY.

Witnesses:
　FRANK C. UPTON,
　PAUL R. WAGNER.

Copies of this patent may be obtained for five cents each, by addressing the "Commissioner of Patents, Washington, D. C."